(12) United States Patent
Kim et al.

(10) Patent No.: US 10,579,460 B2
(45) Date of Patent: Mar. 3, 2020

(54) METHOD AND APPARATUS FOR DIAGNOSING ERROR OF OPERATING EQUIPMENT IN SMART FARM

(71) Applicant: ELECTRONICS AND TELECOMMUNICATIONS RESEARCH INSTITUTE, Daejeon (KR)

(72) Inventors: Se Han Kim, Daejeon (KR); Hyeon Park, Daejeon (KR); Jee Sook Eun, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 284 days.

(21) Appl. No.: 15/822,294

(22) Filed: Nov. 27, 2017

(65) Prior Publication Data

US 2018/0150344 A1    May 31, 2018

(30) Foreign Application Priority Data

Nov. 28, 2016  (KR) .................. 10-2016-0159675
Nov. 10, 2017  (KR) .................. 10-2017-0149805

(51) Int. Cl.
*G06F 11/07*    (2006.01)
*H04L 29/08*    (2006.01)
(Continued)

(52) U.S. Cl.
CPC ............ *G06F 11/079* (2013.01); *G05B 15/02* (2013.01); *G05B 23/0229* (2013.01);
(Continued)

(58) Field of Classification Search
CPC ......... A01C 7/105; A01C 7/081; A01C 7/102; A01C 7/084; A01C 15/006; A01C 1/02;
(Continued)

(56) References Cited

U.S. PATENT DOCUMENTS 5,831,542 A * 11/1998 Thomas ................. A01C 7/105
340/684
7,064,540 B2 * 6/2006 Brune .................... G01V 3/104
324/232

(Continued)

FOREIGN PATENT DOCUMENTS

KR    10-2006-0112533 A    11/2006
KR    10-2012-0108626 A    10/2012
(Continued)

*Primary Examiner* — Mark S Blouin
(74) *Attorney, Agent, or Firm* — LRK Patent Law Firm

(57) ABSTRACT

An error diagnosing method performed by an apparatus for diagnosing an error of operating equipment in a smart farm includes: receiving a control message which triggers an error diagnosis; analyzing data collected from a smart farm on the basis of a preset error diagnostic rule when the control message is received; outputting a result of determining whether an error of the operating equipment installed in the smart farm occurs according to an analysis result; and providing the error determination result to a user through a user interface. It is possible to stably operate and efficiently manage a smart farm.

20 Claims, 12 Drawing Sheets

(51) Int. Cl.
 *G05B 15/02* (2006.01)
 *G05B 23/02* (2006.01)
(52) U.S. Cl.
 CPC ...... *G06F 11/0709* (2013.01); *G06F 11/0751* (2013.01); *G06F 11/0769* (2013.01); *H04L 67/10* (2013.01); *H04L 67/12* (2013.01); *H04L 67/26* (2013.01)
(58) Field of Classification Search
 CPC ......... A01C 1/08; A01C 21/00; A01C 21/005; A01C 7/00; A01C 7/046; A01C 7/128
 USPC .......................................................... 340/684
 See application file for complete search history.

(56) References Cited

U.S. PATENT DOCUMENTS

| | | | |
|---|---|---|---|
| 7,876,231 B2* | 1/2011 | Kim | F24F 11/0086 |
| | | | 340/679 |
| 9,888,081 B1* | 2/2018 | Farinelli, Jr. | H04W 40/20 |
| 2012/0124902 A1* | 5/2012 | Moon | A01G 9/24 |
| | | | 47/17 |
| 2013/0042523 A1 | 2/2013 | Lee et al. | |
| 2014/0376771 A1 | 12/2014 | Moon et al. | |
| 2017/0003179 A1 | 1/2017 | Jin | |

FOREIGN PATENT DOCUMENTS

| | | |
|---|---|---|
| KR | 10-2014-0114089 A | 9/2014 |
| KR | 10-2014-0132873 A | 11/2014 |
| KR | 10-2015-0072487 A | 6/2016 |

* cited by examiner

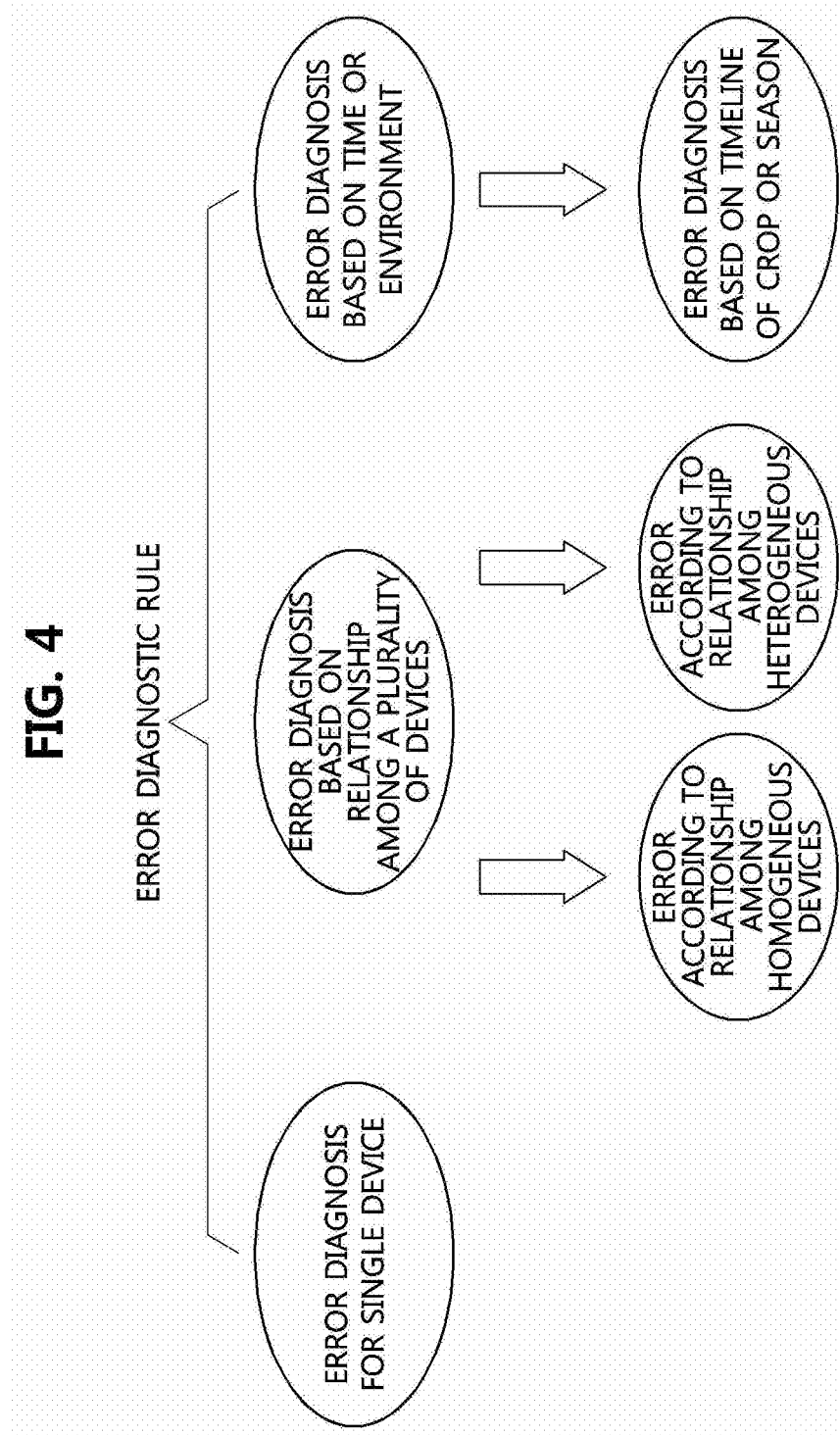

FIG. 5

TABLE LAYOUT

| SYSTEM | | malfunction_detection | | SUB SYSTEM | ERROR DETECTION | | MADE DATE | 2016.08.05 | VER | |
|---|---|---|---|---|---|---|---|---|---|---|
| TABLE ID | | malfunction_event | | TABLE NAME | ERROR DETECTION EVENT | | TABLE LEN | | WRITER | |
| NO | COLUMN ID | COLUMN NAME | DATA TYPE | DEFAULT | NULL | KEY | CODE | REMARK | | |
| 1 | event_time | OCCURRENCE TIME | DATETIME | | NOT NULL | | | YYYY-mm-dd hh:mm:ss:SSS | | |
| 2 | event_id | EVENT IDENTIFIER | SEQUENCE | | NOT NULL | PK | | | | |
| 3 | farm_id | FARM IDENTIFIER | integer | | NOT NULL | | | | | |
| 4 | zone_id | ZONE IDENTIFIER | integer | | NOT NULL | | | | | |
| | house_id | FACILITY IDENTIFIER | integer | | NOT NULL | | | | | |
| 5 | bed_id | SMART BED IDENTIFIER | integer | | NOT NULL | | | | | |
| 6 | event_type | EVENT TYPE | integer | | NOT NULL | | | WILL BE DEFINED LATER | | |
| 7 | device_id | DEVICE IDENTIFIER | integer | | NOT NULL | | | | | |
| 8 | device_type | TYPE OF DEVICE | int | | NOT NULL | | | 1: SENSOR 2: DRIVER 3: COMMUNICATION DEVICE 4: OTHER | | |
| 9 | device_sub_type | SUB-TYPE OF DEVICE | int | | NOT NULL | | | 1: MOISTURE CONTENT 2: TEMPERATURE OF CULTURE MEDIA 3: WEIGHT 4: INSOLATION 5: TEMPERATURE 6: HUMIDITY 7: CO2 8: SUGAR CONTENT 9: FLOW RATE 10: EC 11: Ph | | |
| 10 | value | SENSED VALUE | double | | NULL | | | | | |
| 11 | detect | DETAIL OF MALFUNCTION DETECTION | varchar(1024) | | NULL | | | | | |

FIG. 6

TABLE LAYOUT

| SYSTEM | | malfunction_detection | SUB SYSTEM | ERROR DETECTION | | MADE DATE | 2016.08.05 | VER | |
|---|---|---|---|---|---|---|---|---|---|
| TABLE ID | | sensor_values | | TABLE NAME | OBSERVATION RESULT OF SMART FARM ENVIRONMENT | TABLE LEN | | WRITER | |
| NO | COLUMN ID | COLUMN NAME | DATA TYPE | DEFAULT | NULL | KEY | CODE | REMARK | |
| 1 | sensing_time | OBSERVATION/ COLLECTION TIME | DATETIME | | NOT NULL | PK | | YYYY-mm-dd hh:mm:ss:SSS | |
| 2 | device_id | DEVICE IDENTIFIER | integer | | NOT NULL | PK | | | |
| 3 | farm_id | FARM IDENTIFIER | integer | | NOT NULL | | | | |
| 4 | zone_id | ZONE IDENTIFIER | integer | | NOT NULL | | | | |
| | house_id | FACILITY IDENTIFIER | integer | | NOT NULL | | | | |
| 5 | bed_id | SMART BED IDENTIFIER | integer | | NOT NULL | | | | |
| 6 | value | SENSED VALUE | double | | NULL | | | | |

FIG. 7

TABLE LAYOUT

| SYSTEM | malfunction_detection | | SUB SYSTEM | ERROR DETECTION | | MADE DATE | 2016.08.05 | VER | |
|---|---|---|---|---|---|---|---|---|---|
| TABLE ID | device_metadata | | | TABLE NAME | DEVICE METADATA | | TABLE LEN | | WRITER |
| NO | COLUMN ID | COLUMN NAME | DATA TYPE | DEFAULT | NULL | KEY | CODE | REMARK | |
| 1 | device_id | DEVICE IDENTIFIER | integer | | NOT NULL | PK | | YYYY-mm-dd hh:mm:ss:SSS | |
| 2 | farm_id | FARM IDENTIFIER | integer | | NOT NULL | | | | |
| 3 | zone_id | ZONE IDENTIFIER | integer | | NOT NULL | | | | |
| 4 | house_id | FACILITY IDENTIFIER | integer | | NOT NULL | | | | |
| 5 | bed_id | SMART BED IDENTIFIER | integer | | NOT NULL | | | | |
| 6 | trans_type | TRANSDUCER TYPE | int | | | | | 1: SENSOR 2: DRIVER 3: COMMUNICATION DEVICE 4: OTHER | |
| 7 | device_type | DEVICE TYPE | int | | NOT NULL | | | DEVICE TYPE (SENSOR TYPE, DRIVER TYPE, ETC.) | |
| 8 | unit | UNIT | varchar(12) | | | | | | |
| 9 | data_type | DATA TYPE | int | | | | | | |
| 10 | min | MINIMUM VALUE | float | | | | | | |
| 11 | max | MAXIMUM VALUE | float | | | | | | |
| 12 | install_time | INSTALLATION DATE AND TIME | DATATIME | | NOT NULL | | | | |
| 13 | life_time | LIFETIME (DAYS) | int | | NOT NULL | | | | |
| 14 | interval | TRANSMISSION INTERVAL(sec) | int | | | | | | |
| 15 | update_time | UPDATE TIME | DATATIME | | NOT NULL | | | YYYY-mm-dd hh:mm:ss:SSS | |

FIG. 8

TABLE LAYOUT

| SYSTEM | malfunction_detection | SUB SYSTEM | ERROR DETECTION | MADE DATE | 2016.08.05 | VER | |
|---|---|---|---|---|---|---|---|
| TABLE ID | operation_status | TABLE NAME | SMART FARM OPERATING STATUS INFORMATION | TABLE LEN | | WRITER | |
| NO | COLUMN ID | COLUMN NAME | DATA TYPE | DEFAULT | NULL | KEY | CODE | REMARK |
| 1 | operation_time | OPERATION TIME | DATATIME | | NOT NULL | PK | | YYYY-mm-dd hh:mm:ss:SSS |
| 2 | device_id | DEVICE IDENTIFIER | integer | | | PK | | |
| 3 | farm_id | FARM IDENTIFIER | integer | | NOT NULL | | | |
| 4 | zone_id | ZONE IDENTIFIER | integer | | NOT NULL | | | |
| | house_id | FACILITY IDENTIFIER | integer | | NOT NULL | | | |
| 5 | bed_id | SMART BED IDENTIFIER | integer | | NOT NULL | | | |
| 7 | status | DEVICE OPERATION STATUS | int | | NOT NULL | | | |

FIG. 9

TABLE LAYOUT

| SYSTEM | malfunction_detection | | SUB SYSTEM | ERROR DETECTION | | MADE DATE | 2016.08.05 | VER | |
|---|---|---|---|---|---|---|---|---|---|
| TABLE ID | malfunction_event | | TABLE NAME | ERROR DETECTION EVENT | | TABLE LEN | | WRITER | |
| NO | COLUMN ID | COLUMN NAME | DATA TYPE | DEFAULT | NULL | KEY | CODE | REMARK | |
| 1 | rule_id | RULE IDENTIFIER | SEQUENCE | | NOT NULL | PK | | YYYY-mm-dd hh:mm:ss:SSS | |
| 2 | rule_type | RULE TYPE | NUMBER | | NOT NULL | | | 1: USER-EDITED RULE<br>2: REASONER RULE | |
| 3 | farm_id | FARM IDENTIFIER | integer | | NOT NULL | | | | |
| 4 | zone_id | ZONE IDENTIFIER | integer | | NOT NULL | | | | |
| 5 | house_id | FACILITY IDENTIFIER | integer | | NOT NULL | | | | |
| 6 | bed_id | SMART BED IDENTIFIER | integer | | NOT NULL | | | | |
| 7 | device_id | DEVICE IDENTIFIER | integer | | NOT NULL | | | | |
| 8 | valid_from | VALID RANGE START | float | | NOT NULL | | | | |
| 9 | valid_to | VALID RANGE END | float | | NOT NULL | | | | |
| 10 | rule_exp | RULE EXPRESSION OF RULE REASONER | varchar(1024) | | NOT NULL | | | | |
| 11 | update_time | UPDATE TIME | DATETIME | | NOT NULL | | | | |

FIG. 10

TABLE LAYOUT

| SYSTEM | malfunction_detection | SUB SYSTEM | ERROR DETECTION | | MADE DATE | 2016.08.05 | VER | |
|---|---|---|---|---|---|---|---|---|
| TABLE ID | push_registration | TABLE NAME | PUSH SERVER REGISTRATION ID | | TABLE LEN | | WRITER | |
| NO | COLUMN ID | COLUMN NAME | DATA TYPE | DEFAULT | NULL | KEY | CODE | REMARK |
| 1 | user_id | APP USER ID | varchar(1024) | | NOT NULL | PK | | |
| 2 | push_reg_id | PUSH SERVER REGISTRATION ID | varchar(1024) | | NOT NULL | PK | | |

METHOD AND APPARATUS FOR DIAGNOSING ERROR OF OPERATING EQUIPMENT IN SMART FARM

CROSS-REFERENCE TO RELATED APPLICATIONS

This application claims priority to Korean Patent Application No. 2016-0159675, filed Nov. 28, 2016, and Korean Patent Application No. 2017-0149805, filed Nov. 10, 2017, in the Korean Intellectual Property Office (KIPO), the entire contents of which are hereby incorporated by reference.

BACKGROUND

1. Technical Field

Example embodiments of the present invention generally relate to a method and apparatus for diagnosing an error of operating equipment in a smart farm, and more particularly, to a method of improving operating efficiency of a smart farm by using collectable control data so as to quickly and accurately detect an error of a controller, a sensor device, and the like which are operated in the smart farm.

2. Description of Related Art

Recently, there is a growing interest in smart farms, which are intelligent farms built by combining information communication technology (ICT) with agricultural technology.

Smart farms aim to provide convenience for agricultural productivity improvement and labor saving through various types of monitoring and control, such as diagnosis through monitoring growing of crops and environmental conditions of an inside and outside of a greenhouse utilizing an automated facility horticulture facility (greenhouse). Due to such purpose, smart farms use agricultural ICT sensors (sensing temperature, humidity, $CO_2$, the amount of insolation, wind direction, wind speed, rainfall, the amount of light, soil moisture, soil tension, soil electrical conductivity (EC), soil pH, geothermal heat, etc.) controllers (controlling a skylight, a side window, insulation, a curtain, a ventilator, a flow fan, a watering motor, a watering valve, an air conditioner/heater, etc.), and a communication device.

However, many of these pieces of ICT-related equipment have a high possibility of malfunction due to high temperature and humidity inside a horticulture facility (greenhouse), being exposed to a poor outside environment, a lack of a stable supply of power, and the like. Also, it is difficult to determine whether there is a failure in such equipment in the field of cultivation, and when the equipment is operated under remote control, there is no way to figure out whether the equipment is operating other than through visual confirmation through a camera, and these issues have hindered the spread of smart farms.

Therefore, it is necessary to accurately and quickly detect errors of devices installed in a smart farm to identify problems and correct the errors.

SUMMARY

The present disclosure provides an error diagnosing method performed by an apparatus for diagnosing an error of operating equipment in a smart farm.

The present disclosure also provides an apparatus for diagnosing an error of operating equipment in a smart farm.

In accordance with embodiments of the present disclosure, an error diagnosing method performed by an apparatus for diagnosing an error of operating equipment in a smart farm includes: receiving a control message which triggers an error diagnosis; analyzing data collected from a smart farm on the basis of a preset error diagnostic rule when the control message is received; outputting a result of determining whether an error of the operating equipment installed in the smart farm occurs according to an analysis result; and providing the error determination result to a user through a user interface.

The control message may be a message that requests that an error of an external user terminal or a farm cloud be diagnosed, or a message that is periodically generated in the error diagnosing apparatus.

The collected data may include at least one of operation data of the smart farm, control data of a controller among pieces of the operating equipment, and sensing data of a sensor among the pieces of the operating equipment.

The providing of the error determination result may include transmitting the error determination result to a push server associated with a user terminal of the user.

The analyzing may include referring to status information of the operating equipment included in the collected data and determining that an error occurs in a first sensor when an installation site of the first sensor, which is one of the operating equipment, is close to a controller which controls an environment to be measured by the first sensor.

The error determination result may include an error regarding the installation site of the first sensor.

The analyzing may include determining that an error occurs in a first controller or a second sensor when the first controller is confirmed to be in operation with reference to status information of the first controller included in the collected data and an amount of change in sensing data obtained by the second sensor, which measures environment information controlled by the first controller, is smaller than a threshold value or a change direction of the sensing data is different from that of the status information of the first controller.

The analyzing may include determining that an error occurs in a sensor corresponding to first sensing data when, among sensing data of sensors of the same type, the first sensing data included in the collected data differs from the other sensing data by a threshold value or greater or a change trend of the first sensing data is different from that of the other sensing data.

The analyzing may determine an error of the operating equipment on the basis of a growth stage based on a timeline of a crop.

Further, in accordance with embodiments of the present disclosure, an apparatus for diagnosing an error of operating equipment in a smart farm includes: at least one processor; and a memory in which instructions instructing the at least one processor to perform at least one process are stored, wherein the at least one process includes: a process of receiving a control message which triggers an error diagnosis; a process of analyzing data collected from a smart farm on the basis of a preset error diagnostic rule when the control message is received; a process of outputting a result of determining whether an error of operating equipment installed in the smart farm occurs according to an analysis result; and a process of providing the error determination result to a user through a user interface.

The control message may be a message that requests that an error of an external user terminal or a farm cloud be diagnosed, or a message that is periodically generated in the apparatus.

The collected data may include at least one of operation data of the smart farm, control data of a controller among pieces of the operating equipment, and sensing data of a sensor among the pieces of the operating equipment.

The process of analyzing may include converting the collected data into semantic web-based semantic data.

The process of providing the error determination result to the user may include transmitting the error determination result to a push server associated with a user terminal of the user.

The process of analyzing may include referring to status information of the operating equipment included in the collected data and determining that an error occurs in a first sensor when an installation site of the first sensor, which is one of the operating equipment, is close to a controller which controls an environment to be measured by the first sensor.

The error determination result may include an error regarding the installation site of the first sensor.

Further, in accordance with embodiments of the present disclosure, an error diagnosing method which is performed by an apparatus for diagnosing an error of operating equipment in a smart farm includes: receiving data collected from a smart farm; generating a data table for error diagnosis using the received data; analyzing the data table on the basis of a preset error diagnostic rule; and outputting a result of determining whether an error of operating equipment installed in the smart farm occurs according to an analysis result.

The data table may include an operating device metadata table generated using status information of the operating equipment included in the collected data.

The outputting of the error determination result may further include generating an error detection event table that includes at least one of an occurrence time, type, and content of a determined error, and a zone in which the error occurs.

The error diagnosing method may be further comprising periodically referring to an error detection event table and providing a push server associated with a user terminal with error information in accordance with the error detection event table.

When the above-described method and apparatus for diagnosing an error of operating equipment in a smart farm according to the present invention are used, it is possible to immediately identify an error of operating equipment to prevent equipment control based on erroneous data in advance.

In addition, it is possible to stably operate and efficiently manage a smart farm.

Further, since an ontology-based error diagnosis is performed, accurate error diagnosis can be performed according to various situations.

BRIEF DESCRIPTION OF DRAWINGS

Example embodiments of the present invention will become more apparent by describing example embodiments of the present invention in detail with reference to the accompanying drawings, in which:

FIG. 4 is an example diagram for describing a rule for diagnosing an error of operating equipment in a smart farm according to one embodiment of the present invention.

FIGS. 5 to 10 are data tables for diagnosing an error of operating equipment in a smart farm according to one embodiment of the present invention.

DESCRIPTION OF EXAMPLE EMBODIMENTS

Figure 1:
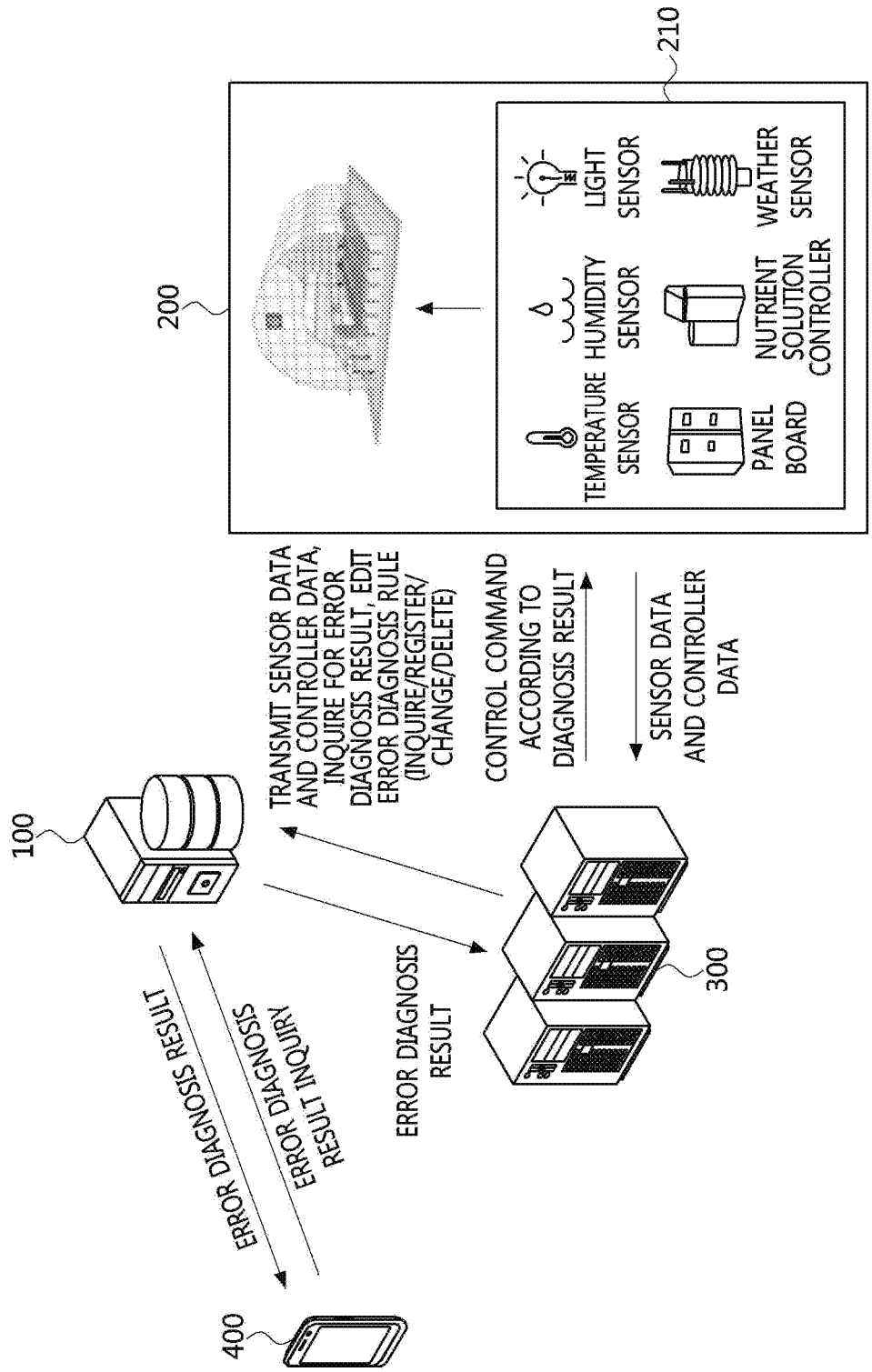
FIG. 1 is a conceptual diagram for describing an environment in which a method of diagnosing an error of operating equipment in a smart farm according to an embodiment of the present invention is performed.

Example embodiments of the present invention are disclosed herein. However, specific structural and functional details disclosed herein are merely representative for purposes of describing example embodiments of the present invention, and example embodiments of the present invention may be embodied in many alternate forms and are not to be construed as being limited to the example embodiments of the present invention set forth herein.

Accordingly, while the invention is susceptible to various modifications and alternative forms, specific embodiments thereof are shown by way of example in the drawings and will herein be described in detail. However, it should be understood that there is no intent to limit the invention to the particular forms disclosed, rather the invention is to cover all modifications, equivalents, and alternatives falling within the spirit and scope of the invention. Like numbers refer to like elements throughout the description of the figures.

It should be understood that, although the terms first, second, etc. may be used herein to describe various elements, these elements are not limited by these terms. These terms are only used to distinguish one element from another. For example, a first element could be termed a second element, and, similarly, a second element could be termed a first element without departing from the scope of the present invention. As used herein, the term "and/or" includes any and all combinations of one or more of the associated listed items.

It should be understood that when an element is referred to as being "connected" or "coupled" to another element, the element can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to limit the invention. As used herein, the singular forms "a," "an,"

and "the" are intended to include the plural forms as well, unless the context clearly indicates otherwise. It should be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It should be further understood that terms, such as those defined in commonly used dictionaries, are to be interpreted as having a meaning that is consistent with their meaning in the context of the relevant art and are not to be interpreted in an idealized or overly formal sense unless expressly so defined herein.

It should also be noted that, in some alternative implementations, functions/actions noted in blocks may occur out of the order noted in the flowcharts. For example, two blocks shown in succession may in fact be executed substantially concurrently, or the blocks may sometimes be executed in the reverse order depending upon the functions/actions involved.

FIG. 1 is a conceptual diagram for describing an overall system in which a method of diagnosing an error of operating equipment in a smart farm according to an embodiment of the present invention is performed.

Referring to FIG. 1, an overall system in which the method of diagnosing an error of operating equipment in a smart farm is performed includes an error diagnosing apparatus 100, a smart farm 200, a farm cloud 300, and/or a user terminal 400 of a smart farm operator.

The smart farm 200 may be a greenhouse in which various sensors and controllers are installed to grow crops, and various smart farm operating devices 210 may be installed therein.

Examples of the smart farm operating device 210 may include an outdoor sensor to measure an environment (temperature, humidity, wind direction, wind speed, amount of insolation, $CO_2$, etc.) outside the greenhouse, a root-zone sensor to measure a growth environment (temperature of culture media, moisture content, load cell, etc.) of a place near the crops in the greenhouse, a weather sensor to measure an environment (temperature, moisture, $CO_2$, amount of insolation, etc.) inside the greenhouse, a nutrient solution/drainage solution sensor to measure conditions (flow rate, electrical conductivity (EC), pH, etc.) of nutrient and drainage solutions, a controller to control the environment (cooling and heating, opening and closing ventilation windows, controlling ventilation, etc.) inside and outside the greenhouse, a power supply, and the like.

The error diagnosing apparatus 100 is a device that monitors status of operating devices installed in the smart farm 200 in real time and detects errors thereof. Although the error diagnosing apparatus 100 is shown as a separate device in the drawing, the error diagnosing apparatus 100 may be configured to be included in the farm cloud 300.

The farm cloud 300 is a cloud server that provides cloud-based software and services to a farmer which operates a smart farm and may relay between the error diagnosing apparatus 100 and the smart farm 200, or may be equipped with software in which a function module according to the error diagnosing apparatus 100 is implemented.

The user terminal 400 may be a mobile terminal that provides information to the smart farm operator in cooperation with the error diagnosing apparatus 100 and receives control commands, and may be equipped with software in which relevant function modules are implemented.

As an operation of the overall system in which the method of diagnosing an error of operating equipment in a smart farm according to one embodiment of the present invention is performed, when the farm cloud 300 receives data of an operating device (sensors, controllers, etc.) installed in the smart farm 200, the farm cloud 300 may transmit the received data to the error diagnosing apparatus 100. At this time, the farm cloud 300 may issue a request to the error diagnosing apparatus 100 to inquire about an error diagnosis result, and may edit (inquire, register, change, or delete) an error diagnostic rule built into the error diagnosing apparatus 100.

When the error diagnosing apparatus 100 receives the inquiry request for the error diagnosis result from the farm cloud 300, the error diagnosing apparatus 100 may transmit the error diagnosis result to the farm cloud 300.

In this case, the user terminal 400 of the smart farm operator may also issue an inquiry request for the error diagnosis result and receive the error diagnosis result from the error diagnosing apparatus 100.

Figure 2:
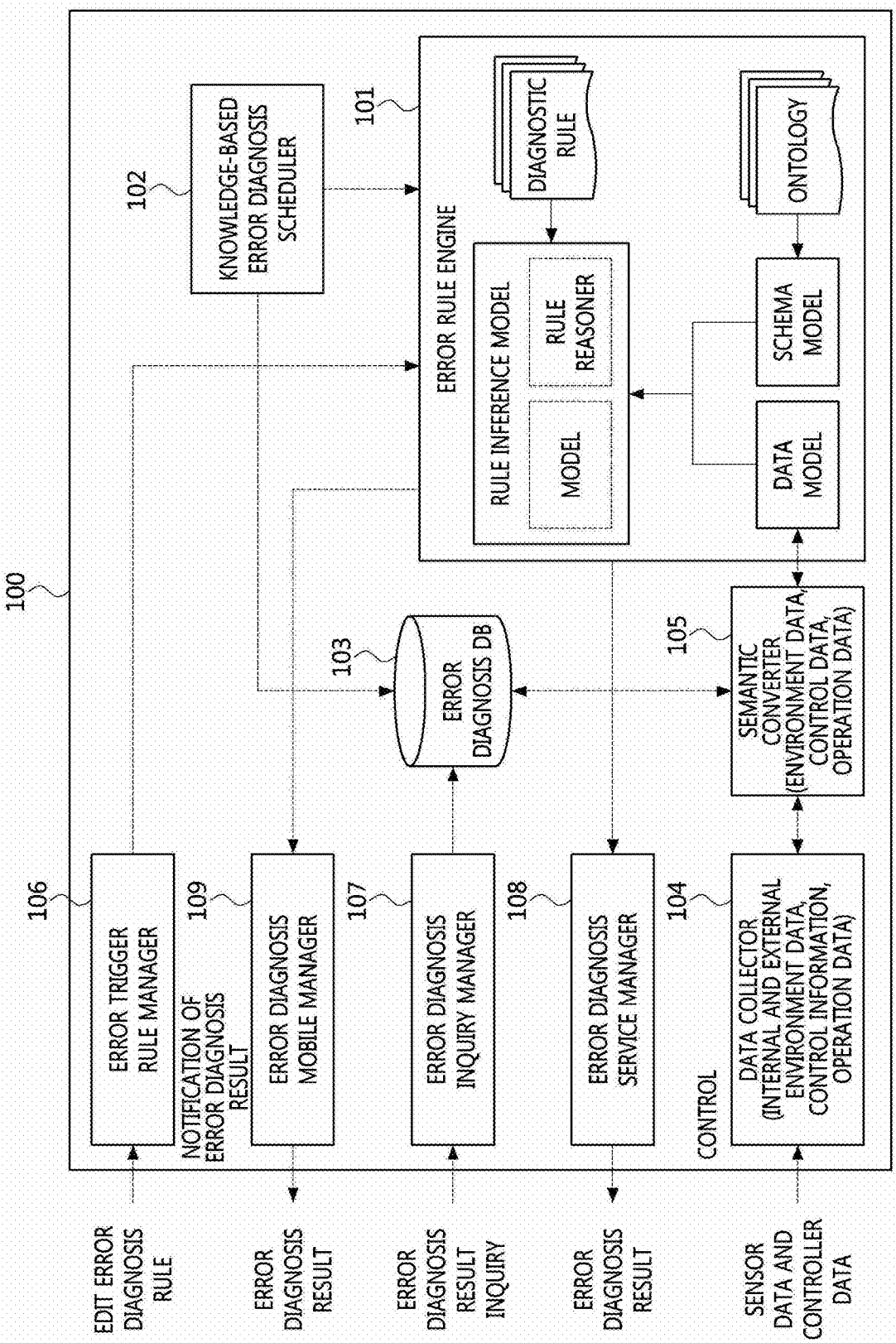
FIG. 2 is a configuration diagram illustrating function modules of an apparatus for diagnosing an error of operating equipment in a smart farm according to one embodiment of the present invention.

FIG. 2 is a configuration diagram illustrating function modules of an apparatus for diagnosing an error of operating equipment in a smart farm according to one embodiment of the present invention.

Referring to FIG. 2, an error diagnosing apparatus 100 according to one embodiment of the present invention includes an error rule engine 101 to determine whether there is an error in a smart farm operating device, a knowledge-based error diagnosis scheduler 102 to manage and operate various events occurring before and after the error determination, a semantic converter 105 to convert a variety of externally collected data (sensing data, controller data, operating data, and the like) into semantic web-based data, a malfunction diagnosis database 103 in which the semantic data generated by the semantic converter 105 is stored, and/or a number of interfaces 104, 106, 107, 108, and 109 to provide a service to an external device.

First, a data collector 104 may collect a variety of data (environment data of an inside and outside of a greenhouse, control data, operating data, and the like) from the smart farm 200 or the farm cloud 300 of FIG. 1. That is, the data collector 104 may directly collect the data through the smart farm 200, or may collect the data from the farm cloud 300 in which data collected from the smart farm 200 is stored.

The semantic converter 105 may perform preprocessing (filtering, data normalization/conversion, and the like) on the data collected by the data collector 104 to convert the data into semantic web-based data, and may store the converted data in the error diagnosis database 103. In this case, data to be stored in the error diagnosis database 103 may be periodically collected through the data collector 104 at every collection interval determined according to a user setting, and may be preprocessed through the semantic converter 105 and stored. A large amount of data is accumulated in the error diagnosis database 103 in accordance with the periodic collection, and thus an error can be more accurately diagnosed.

The error rule engine 101 may perform error diagnosis using a knowledge base enabling rule-based reasoning. At this time, by using the data converted into the semantic form by the semantic converter 105, it is possible to automatically infer that an error has occurred.

The error rule engine 101 may include a data model which defines a data model for a sensor and a control state for error diagnosis, a schema model which is a logical structure of data, an ontology which defines relationships between pieces of data in the schema model, a diagnostic rule which define rules for diagnosing an error, and a rule reasoner which diagnoses an error in a collected data model based on an inference model set by the diagnostic rule.

The knowledge-based error diagnosis scheduler 102 may inquire about a malfunction diagnosis result inferred through periodic inquiries.

An error trigger rule manager 106 may receive an request that the error diagnostic rule be edited from an external user terminal or a farm cloud, and may input or change the diagnostic rule of the error rule engine 101 in consideration of a collection interval of data collected through the data collector 104, a change of status according to the control, and a change of rule to be applied.

An error diagnosis service provided by the error diagnosing apparatus 100 may provide a diagnosis result in response to a user request or may provide the diagnosis result in the form of a push notification or alarm through periodic error monitoring.

An error diagnosis inquiry manager 107 may support a service requested by the user. Specifically, the error diagnosis inquiry manager 107 may receive an error diagnosis request from the user terminal or the farm cloud and transmit an error diagnosis result and/or a current status to the user terminal or the farm cloud.

Then, an error diagnosis mobile manager 109 may support a diagnosis result provision service through periodic monitoring. Specifically, the error diagnosis mobile manager 109 may periodically monitor the error diagnosis database 103 to check the error diagnosis result. When it is confirmed that an error occurs in the operating device of the smart farm, the error diagnosis mobile manager 109 may transmit the error diagnosis result to the external user terminal through a push server or may transmit the error diagnosis result to the farm cloud.

A user running the smart farm may quickly take action on the operating device installed in the smart farm by checking the error diagnosis result through the error diagnosis mobile manager 109 or the error diagnosis inquiry manager 107, as described above.

Figure 3:
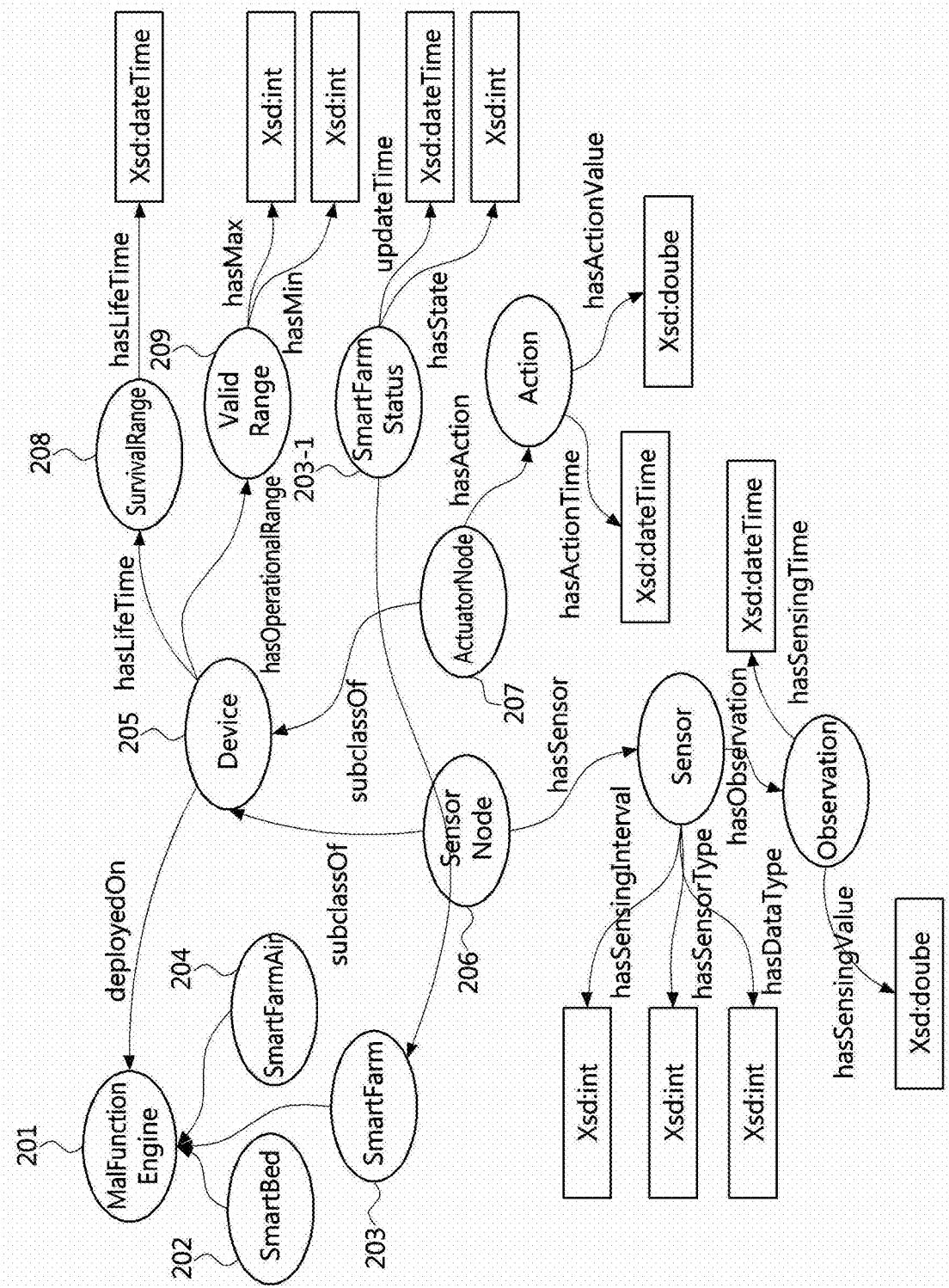
FIG. 3 is a data relation diagram for describing an implementation example of an apparatus for diagnosing an error of operating equipment in a smart farm according to one embodiment of the present invention.

FIG. 3 is a data relation diagram for describing an example in which an apparatus for diagnosing an error of operating equipment in a smart farm according to one embodiment of the present invention is implemented.

Referring to FIG. 3, an apparatus (MalFunction_Engine) 201 for diagnosing an error of operating equipment in a smart farm includes a SmartBed 202, a SmartFarm 203, and SmartFarmAir 204, which are resources.

The SmartBed 202 is a collection of sensors and controllers located in the center of the root zone and installed inside the greenhouse, and the SmartFarm 203 is a greenhouse of a farmer, and may be identified by a greenhouse ID. In addition, the SmartFarmAir 204 may be environment information about the inside and outside of the greenhouse. SmartFarmStatus 203-1 may be composed of a greenhouse operation time (cumulative time of use for cultivation) and a status (operational status).

In addition, the error diagnosing apparatus (MalFunction_Engine) 201 may include a device 205 installed in the greenhouse, and the device 205 may include subclasses and cumulative times of use (lifetimes of the sensor and controller) (Survival Range) 208 of the of a sensor node 206 and a controller (ActuatorNode) 207, and a valid range (Valid Range) 209 having a maximum value and a minimum value of each of the sensor and controller.

The sensor node 206 may include a plurality of collection intervals (hasSensingInterval), a sensor type (hasSensorType), a sensing data type (hasDataType) for each sensor type, and a sensed value (hasSensingValue) of each sensor.

The controller (AcutatorNode) 207 consists of a control status collection interval (hasActuatorInterval), a type of ther controller (hasActuatorType), and a controller operation (hasAction) which represents a control command and controller status for each controller type, and the controller operation consists of a control value (hasActionValue) for each controller and a controller operating time (hasActionTime).

The error diagnosing apparatus according to FIG. 3 should be understood as an example of an error diagnosing apparatus implemented by one skilled in the art of the present invention, and is not to be construed as limiting the constituent elements of the present invention.

FIG. 4 is an example diagram for describing a rule for diagnosing an error of operating equipment in a smart farm according to one embodiment of the present invention.

Referring to FIG. 4, the rule for diagnosing an error of operating equipment in a smart farm may be classified into, for example, error diagnosis of a single device, error diagnosis based on a relationship among a plurality of devices, and error diagnosis based on time or environment.

Examples of the error diagnostic rule for a single device are as below.

First, since each sensor has a valid measurement range (see reference numeral 209 in FIG. 3), when a value exceeding the valid measurement range is collected as sensing data, it may be diagnosed that an error occurs in the corresponding sensor. At this time, a notification of "exceeding the valid range" may be provided as the error diagnosis result to the user.

In addition, installation location information is collected as status information of a sensor, and when it is determined that the collected installation location information is not appropriate, it may be diagnosed that an error occurs in the corresponding sensor. Specifically, when a temperature sensor is located near a controller for controlling temperature, such as a blower or a boiler, a temperature measured by the temperature sensor is unreliable, and thus it may be diagnosed that an error occurs in the temperature sensor. Therefore, in other words, when an installation site of an operating device, which is one of sensors, is referred to and installation site is determined to be adjacent to the controller that controls the environment measured by the sensor, it may be diagnosed that an error occurs in the corresponding operating device. In this case, a notification of "installation site error" may be provided to the user as the error diagnosis result.

In addition, when sensing data of a sensor (hasSensingValue in FIG. 3) is not collected or sensing time (hasSensingTime in FIG. 3) is not updated, it may be diagnosed that an error occurs in the corresponding sensor. In this case, a notification of "communication failure or device failure" may be provided to the user. as the error diagnosis result In addition, since the operating device, such as a sensor or a controller, has a lifetime (see reference numeral 208 in FIG. 3), when a check result of status information of the device indicates that the operating time exceeds the lifetime of the device, it may be diagnosed that an error occurs in the operating device. In this case, a notification of "lifetime exceeded" may be provided to the user as the error diagnosis result.

The error diagnostic rule based on a relationship among a plurality of devices may be classified according to whether the plurality of devices are homogeneous.

Examples of the error diagnostic rule based on a relationship between heterogeneous devices will be described below.

First, when there is a correlation between first sensing data and second sensing data and changes (specifically, amounts of change or directions of change) of the first sensing data and the second sensing data are different, it may be diagnosed that an error occurs in at least one of a sensor for measuring the first sensing data and a sensor for measuring the second sensing data. Specifically, for example, because temperature and humidity generally change in association with each other, when there is a change in temperature data measured by a temperature sensor while there is no change in humidity data measured by a humidity sensor, it may be diagnosed that an error occurs in the humidity sensor. In this case, a notification of "sensor failure" may be provided to the user as the error diagnosis result.

In addition, in a case in which it is determined that a controller is operating while referring to status information of the controller, when the amount of change of sensing data obtained by a sensor which measures environment information controlled by the controller is small or the direction of change of the sensing data is different, it may be diagnosed that an error occurs the controller or the sensor. In this case, a notification of "failure of the corresponding controller or sensor" may be provided to the user as the error diagnosis result.

Specifically, for example, when temperature data measured by a temperature sensor is slightly reduced or does not change (or the amount of change is insignificant) in a state in which a boiler, which is one of controllers, operates, it may be diagnosed that an error occurs in the temperature sensor or the boiler. In addition, when the temperature data measured by the temperature sensor does not change (or the amount of change is insignificant) in a state in which a side-window motor is controlled to open a side window (window of the smart farm), it may be diagnosed that an error occurs in the temperature sensor or the side-window motor.

In addition, an error may be diagnosed on the basis of a relationship between a power supply device and an operating device supplied with power by the power supply device, as heterogeneous devices. For example, in a case in which there is no voltage or current change in a controller even when the controller is operated, it may be diagnosed that an error occurs in the controller or the power supply. In addition, when a voltage and current supplied from the power supply device is compared to a prevailing voltage and current of the controller, sensor, and communication device supplied with power and exceeds an allowable range (over and below the range), the corresponding operating device has a higher possibility of malfunction, and thus it may be diagnosed that an error occurs in the operating device.

Examples of the error diagnostic rule based on a relationship of homogeneous devices will be described below.

First, when a difference in pieces of sensing data measured by the same kind of sensors in a smart farm is greater than or equal to a threshold value or a change trend (or direction) of the sensing data is different, it may be diagnosed that error occurs in at least one of the sensors. For example, when, among temperature data measured by a plurality of temperature sensors, there is a temperature sensor which measures temperature data that differs by more than a threshold value, it may be diagnosed that an error occurs in the temperature sensor. In addition, when the temperature data measured by the plurality of temperature sensors is continuously increasing at a predetermined time interval but one piece of the temperature data is decreasing (the change trend is different), it may be diagnosed that an error occurs in a temperature sensor corresponding to the decreasing temperature data. In this case, a notification of "failure of at least one of a plurality of sensors" may be provided to the user as the error diagnosis result.

Meanwhile, an error diagnosis on the basis of time or environment may correspond to a rule for diagnosing an error of an operating device on the basis of a crop timeline-based growth stage. For example, even in a case in which a temperature should be high on winter night according to a growth stage based on a timeline of a crop managed in a smart farm, when a boiler, which is a controller, is not operated, an air conditioner is operated, or a side window is controlled to be opened by the side-window motor, it may be diagnosed that an error occurs in the controller.

FIGS. 5 to 10 are data tables for diagnosing an error of operating equipment in a smart farm according to one embodiment of the present invention.

Specifically, FIG. 5 is an error detection event table generated using an error analysis result of an operating device. FIG. 6 is a smart farm environment data table generated using data obtained by measuring an environment of a smart farm. FIG. 7 is an operating device metadata table generated using status information of operating devices in the smart farm. FIG. 8 is a smart farm operating information table generated using operational status information of the smart farm. FIG. 9 is a data table for managing an error diagnostic rule. FIG. 10 is an ID management table of a push server which provides an error diagnosis result as a push service.

Referring to FIG. 5, the error detection event table is a data table showing an error analysis result, and may include at least one of an error occurrence time, an error event identifier, an identifier of a farm at which the error occurs, a zone identifier, a facility identifier, a smart bed identifier, a type of error event, a type or sub-type of device in which an error is detected, a sensed value, and error content. Here, the error content may include the above-described violation of an installation site, departure from a measurement range, and the like.

Referring to FIG. 6, the smart farm environment data table is a data table showing information about sensing data measured by various sensors installed in the smart farm, and may include a sensing time, an identifier of a measured device, a farm identifier, a zone identifier, a facility identifier, a smart bed identifier, a sensed value, and the like.

Referring to FIG. 7, the operating device metadata table is a data table including status information of various operating devices installed in the smart farm, and may include a device identifier, a farmer identifier, a zone identifier, a smart bed identifier, a transducer type (sensor, controller, etc.), a device type (sub-type of a device, such as a type of sensor, a type of controller, etc.), a sensing or control range (minimum and maximum), installation date and time, a use time, a data transfer interval, an update time, and the like.

Referring to FIG. 8, the smart farm operation information table is a data table showing an operational status of the smart farm, and may include an operation time, a farm identifier, an identifier of an installed operation device, a zone identifier, a facility identifier, a smart bed identifier, an operational status, and the like.

Referring to FIG. 9, the data table for managing the error diagnostic rule may include a rule identifier, a rule type, an expression about a rule, a rule update time, and the like. Here, the error diagnostic rule may include a rule directly edited by a user or a rule inferred on the basis of collected data.

Referring to FIG. 10, the ID management table of the push server may include a smart farm user associated with the push server, a user terminal identifier, a push server identifier, and the like.

Figure 11:
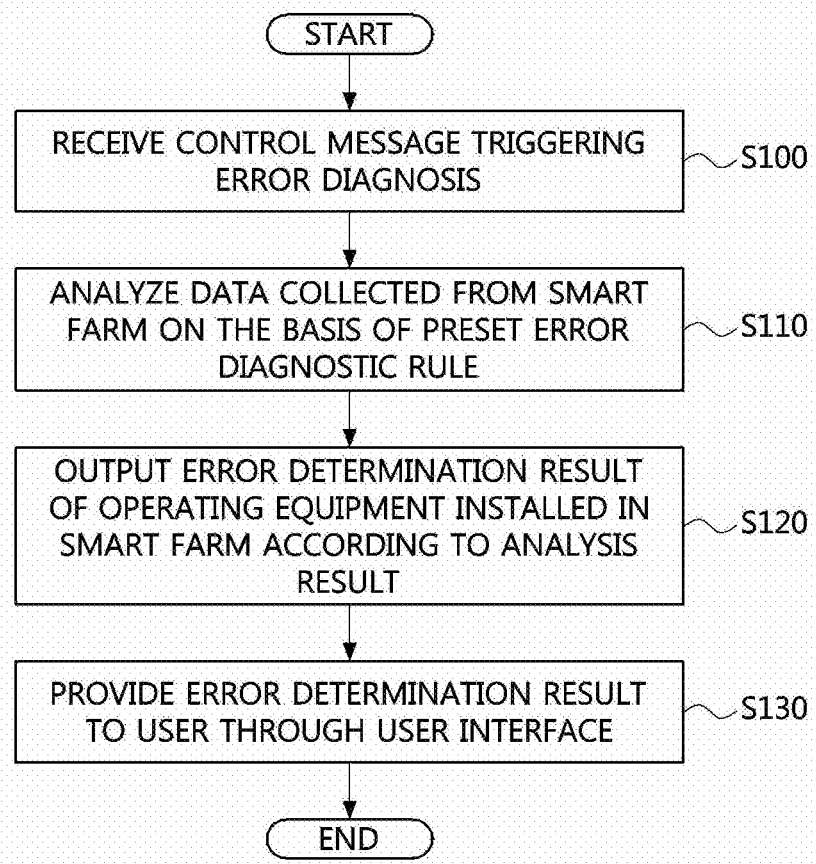
FIG. 11 is a flowchart of a method of diagnosing an error of operating equipment in a smart farm according to a first embodiment of the present invention.

FIG. 11 is a flowchart of a method of diagnosing an error of operating equipment in a smart farm according to a first embodiment of the present invention.

Referring to FIG. 11, an error diagnosing method performed by an apparatus for diagnosing an error of operating equipment in a smart farm may include receiving a control message which an triggers error diagnosis (S100), analyzing data collected from the smart farm on the basis of a preset error diagnostic rule (S110) when the control message is received, outputting a result of determining whether an error of an operating device installed in the smart farm occurs according to an analysis result (S120), and providing the error determination result to a user through a user interface (S130).

Here, the control message may be a message that requests that an error of an external user terminal or a farm cloud be diagnosed, or a message that is periodically generated in the error diagnosing apparatus.

In this case, the user interface may include a user device or a display device of the farm cloud which is associated with an error detection device through a wired/wireless network, a software module of the error detection device which receives a request message and transmits a result message in association with the user terminal or the farm cloud, and the like in addition to a display device that is directly coupled or associated with the error detection device.

In this case, the collected data may include at least one of operation data of the smart farm, control data of the controller among the operating devices, and sensing data of the sensor among the operating devices.

Here, the process of providing the error determination result to the user (S130) may include transmitting the error determination result to a push server associated with a user terminal of the user. In this case, the push server may transmit the error determination result to the user terminal as a push message (alarm) so that the error determination result can be checked in the user terminal. At this time, the push message may be transmitted when the error of the smart farm is periodically diagnosed and the diagnosis result indicates it is determined that the smart farm has an error.

The analysis process (S110) may include referring to status information of operating equipment included in the collected data and determining that an error occurs in a first sensor when the status information indicates that an installation site of the first sensor, which is one of operating equipment, is close to a controller which controls an environment to be measured by the first sensor.

In this case, the error determination result may include an error regarding the installation site of the first sensor.

The analysis process (S110) may include determining that an error occurs in the first controller or a second sensor when the first controller is confirmed to be in operation with reference to status information of the first controller included in the collected data and an amount of change in sensing data obtained by the second sensor, which measures environment information controlled by the first controller, is smaller than a threshold value or a change direction of the sensing data is different from that of the status information of the first controller.

The analysis process (S110) may include determining that an error occurs in a sensor corresponding to first sensing data when, among sensing data of sensors of the same type included in the collected data, the first sensing data differs from the other sensing data by a threshold value or greater or a change trend of the first sensing data is different from that of the other sensing data.

In this case, in the analysis process (S110), an error of the operating equipment may be determined on the basis of a growth stage based on a timeline of a crop.

Here, the process of outputting the error determination result (S120) may include determining detailed content of the error (type, occurrence time, an identifier of a device in which the error occurs, a farm in which the error occurs, a zone identifier, and the like) determined according to the analysis process (S110).

Here, the process of outputting the error determination result (S120) may include providing the error determination result to the user interface.

Here, the process of outputting the error determination result (S120) may include storing the error determination result in a data table.

Figure 12:
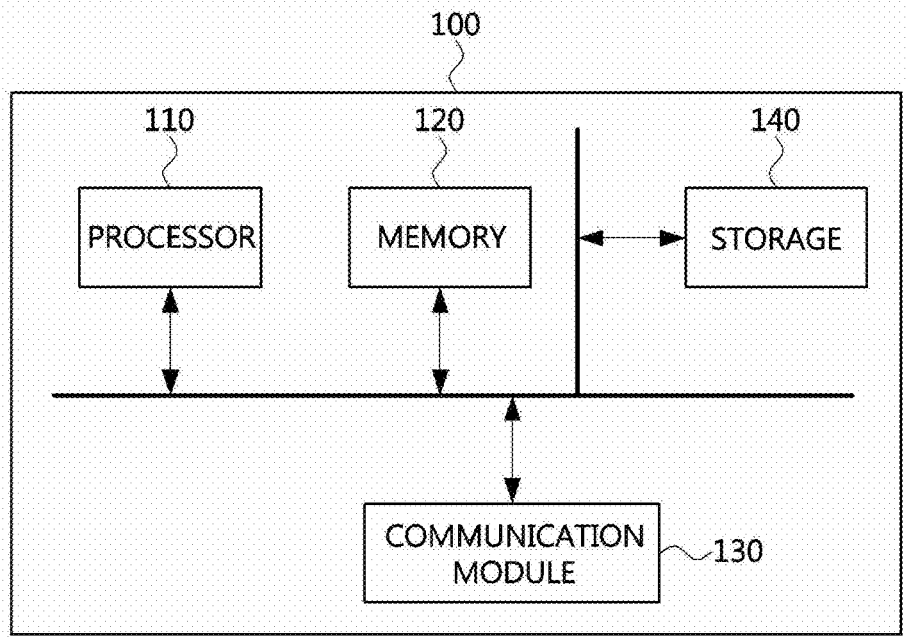
FIG. 12 is a configuration diagram illustrating an apparatus for diagnosing an error of operating equipment in a smart farm according to one embodiment of the present invention.

FIG. 12 is a configuration diagram illustrating an apparatus for diagnosing an error of operating equipment in a smart farm according to one embodiment of the present invention.

Referring to FIG. 12, an apparatus 100 for diagnosing an error of operating equipment in a smart farm includes at least one processor 110 and a memory 120 in which instructions instructing the processor 110 to perform at least one process are stored.

The apparatus 100 for diagnosing an error of operating equipment in a smart farm may further include a communication module 130 capable of communicating with an external farm cloud or a user terminal of a smart farm operator through a wired/wireless network.

The apparatus 100 for diagnosing an error of operating equipment in a smart farm may further include a storage 140 in which data transmitted and received in the process of error determination, intermediate data, and data (or data table) regarding an error determination result are stored.

In this case, the at least one process may include receiving a control message which triggers an error diagnosis, analyzing data collected from a smart farm on the basis of a preset error diagnostic rule when the control message is received, outputting a result of determining an error of an operating device installed in the smart farm according to an analysis result, and providing the error determination result to a user through a user interface.

Here, the control message may be a message that requests that an error of an external user terminal or a farm cloud be diagnosed, or a message that is periodically generated in the error diagnosing apparatus.

Here, the collected data may include at least one of operation data of the smart farm, control data of a controller among pieces of operating equipment, and sensing data of a sensor among the pieces of operating equipment.

Here, the analysis process may include converting the collected data into semantic web-based semantic data.

Here, the process of providing the error determination result to the user may include transmitting the error determination result to a push server associated with a user terminal of the user.

The analysis process may include referring to status information of the operating equipment included in the collected data and determining that an error occurs in a first sensor when an installation site of the first sensor, which is one of the operating equipment, is close to a controller which controls an environment to be measured by the first sensor.

Here, the error determination result may include a determination of an error regarding the installation site of the first sensor.

Examples of the error diagnosing apparatus 100 may include a desktop computer capable of communication, a laptop computer, a notebook computer, a smart phone, a tablet personal computer (PC), a mobile phone, a smart watch, smart glasses, an e-book reader, a portable multimedia player (PMP), a portable game player, a navigation device, a digital camera, a digital multimedia broadcasting (DMB) player, a digital audio recorder, a digital audio player, a digital video recorder, a digital video player, a personal digital assistant (PDA), and the like.

Figure 13:
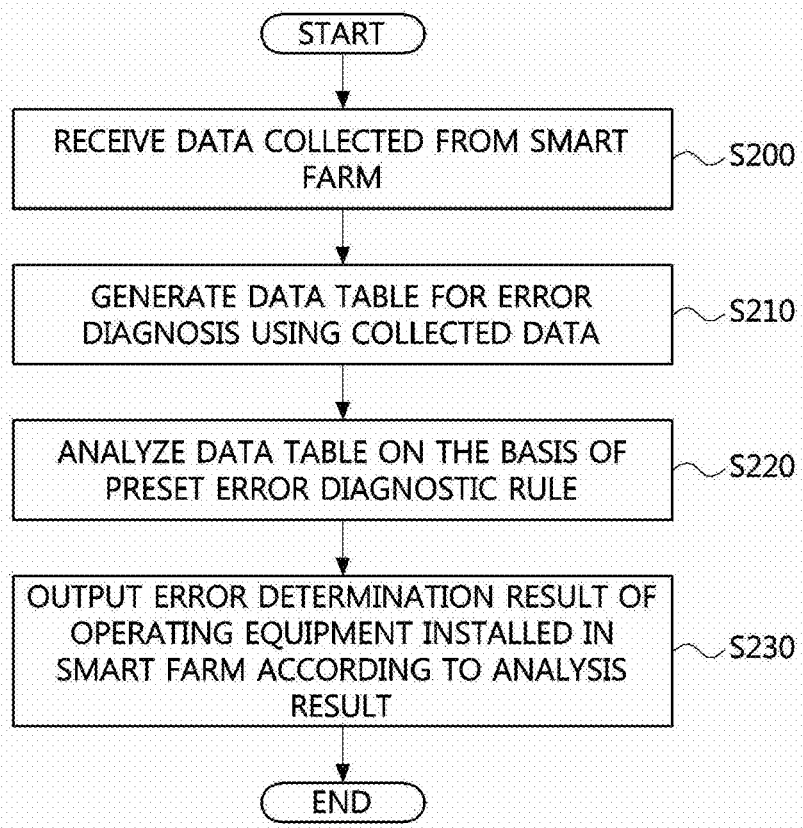
FIG. 13 is a flowchart of a method of diagnosing an error of operating equipment in a smart farm according to a second embodiment of the present invention.

FIG. 13 is a flowchart of a method of diagnosing an error of operating equipment in a smart farm according to a second embodiment of the present invention.

Referring to FIG. 13, an error diagnosing method performed by an apparatus for diagnosing an error of operating equipment in a smart farm includes receiving data collected from a smart farm (S200), generating a data table for error diagnosis using the received data (S210), analyzing the data table on the basis of a preset error diagnostic rule (S220), and outputting a result of determining whether an error of an operating device installed in the smart farm occurs according to an analysis result (S230).

Here, the data table may include an operating device metadata table generated using status information of an operating device included in the collected data.

Here, the process of outputting the error determination result (S230) may further include generating an error detection event table that includes at least one of an occurrence time, type, and content of the determined error, and a zone in which the error occurs.

In this case, the error diagnosing method may further include periodically referring to the error detection event table and providing a push server associated with a user terminal with error information in accordance with the error detection event table.

When the above-described method and apparatus for diagnosing an error of operating equipment in a smart farm according to the present invention are used, it is possible to immediately identify an error of operating equipment to prevent equipment control based on erroneous data in advance.

In addition, it is possible to stably operate and efficiently manage a smart farm.

Further, since an ontology-based error diagnosis is performed, accurate error diagnosis can be performed according to various situations.

The methods according to embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software. Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the operation of the present disclosure, and vice versa.

While the example embodiments of the present invention and their advantages have been described in detail, it should be understood that various changes, substitutions, and alterations may be made herein without departing from the scope of the invention.

What is claimed is:

1. An error diagnosing method performed by an apparatus for diagnosing an error of operating equipment in a smart farm, the error diagnosing method comprising:
    receiving a control message which triggers an error diagnosis;
    analyzing data collected from a smart farm on the basis of a preset error diagnostic rule when the control message is received;
    outputting a result of determining whether an error of the operating equipment installed in the smart farm occurs according to an analysis result; and
    providing the error determination result to a user through a user interface.

2. The error diagnosing method of claim 1, wherein the control message is a message that requests that an error of an external user terminal or a farm cloud be diagnosed, or a message that is periodically generated in the error diagnosing apparatus.

3. The error diagnosing method of claim 1, wherein the collected data includes at least one of operation data of the smart farm, control data of a controller among pieces of the operating equipment, and sensing data of a sensor among the pieces of the operating equipment.

4. The error diagnosing method of claim 1, wherein the providing of the error determination result includes transmitting the error determination result to a push server associated with a user terminal of the user.

5. The error diagnosing method of claim 1, wherein the analyzing includes referring to status information of the operating equipment included in the collected data and determining that an error occurs in a first sensor when an installation site of the first sensor, which is one of the operating equipment, is close to a controller which controls an environment to be measured by the first sensor.

6. The error diagnosing method of claim 5, wherein the error determination result includes an error regarding the installation site of the first sensor.

7. The error diagnosing method of claim 1, wherein the analyzing includes determining that an error occurs in a first controller or a second sensor when the first controller is confirmed to be in operation with reference to status information of the first controller included in the collected data and an amount of change in sensing data obtained by the second sensor, which measures environment information controlled by the first controller, is smaller than a threshold value or a change direction of the sensing data is different from that of the status information of the first controller.

8. The error diagnosing method of claim 1, wherein the analyzing includes determining that an error occurs in a sensor corresponding to first sensing data when, among sensing data of sensors of the same type, the first sensing data included in the collected data differs from the other sensing data by a threshold value or greater or a change trend of the first sensing data is different from that of the other sensing data.

9. The error diagnosing method of claim 1, wherein the analyzing determines an error of the operating equipment on the basis of a growth stage based on a timeline of a crop.

10. An apparatus for diagnosing an error of operating equipment in a smart farm, the apparatus comprising:
   at least one processor; and
   a memory in which instructions instructing the at least one processor to perform at least one process are stored,
   wherein the at least one process includes:
   a process of receiving a control message which triggers an error diagnosis;
   a process of analyzing data collected from a smart farm on the basis of a preset error diagnostic rule when the control message is received;
   a process of outputting a result of determining whether an error of operating equipment installed in the smart farm occurs according to an analysis result; and
   a process of providing the error determination result to a user through a user interface.

11. The apparatus of claim 10, wherein the control message is a message that requests that an error of an external user terminal or a farm cloud be diagnosed, or a message that is periodically generated in the apparatus.

12. The apparatus of claim 10, wherein the collected data includes at least one of operation data of the smart farm, control data of a controller among pieces of the operating equipment, and sensing data of a sensor among the pieces of the operating equipment.

13. The apparatus of claim 10, wherein the process of analyzing includes converting the collected data into semantic web-based semantic data.

14. The apparatus of claim 10, wherein the process of providing the error determination result to the user includes transmitting the error determination result to a push server associated with a user terminal of the user.

15. The apparatus of claim 10, wherein the process of analyzing includes referring to status information of the operating equipment included in the collected data and determining that an error occurs in a first sensor when an installation site of the first sensor, which is one of the operating equipment, is close to a controller which controls an environment to be measured by the first sensor.

16. The apparatus of claim 15, wherein the error determination result includes an error regarding the installation site of the first sensor.

17. An error diagnosing method which is performed by an apparatus for diagnosing an error of operating equipment in a smart farm, the error diagnosing method comprising:
   receiving data collected from a smart farm;
   generating a data table for error diagnosis using the received data;
   analyzing the data table on the basis of a preset error diagnostic rule; and
   outputting a result of determining whether an error of operating equipment installed in the smart farm occurs according to an analysis result.

18. The error diagnosing method of claim 17, wherein the data table includes an operating device metadata table generated using status information of the operating equipment included in the collected data.

19. The error diagnosing method of claim 17, wherein the outputting of the error determination result further includes generating an error detection event table that includes at least one of an occurrence time, type, and content of a determined error, and a zone in which the error occurs.

20. The error diagnosing method of claim 19, further comprising periodically referring to an error detection event table and providing a push server associated with a user terminal with error information in accordance with the error detection event table.

* * * * *